Nov. 7, 1961
R. J. McNAMARA ET AL  3,007,836
METHOD AND APPARATUS FOR PRODUCING A RUG
WITH A LAMINATED BACKING
Filed Nov. 21, 1957
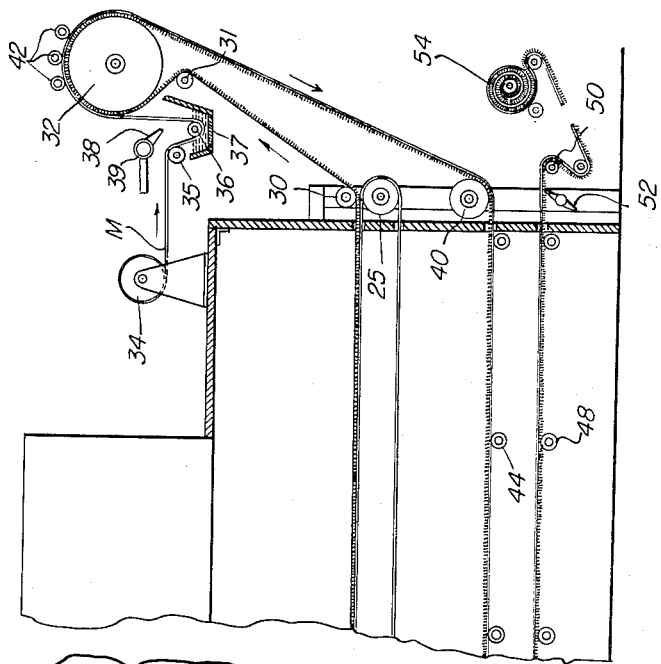
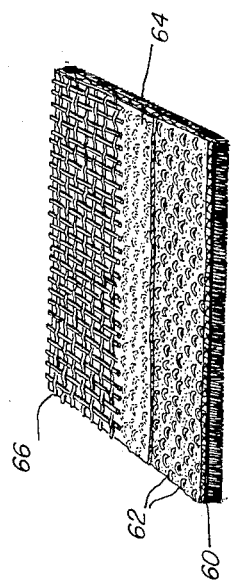
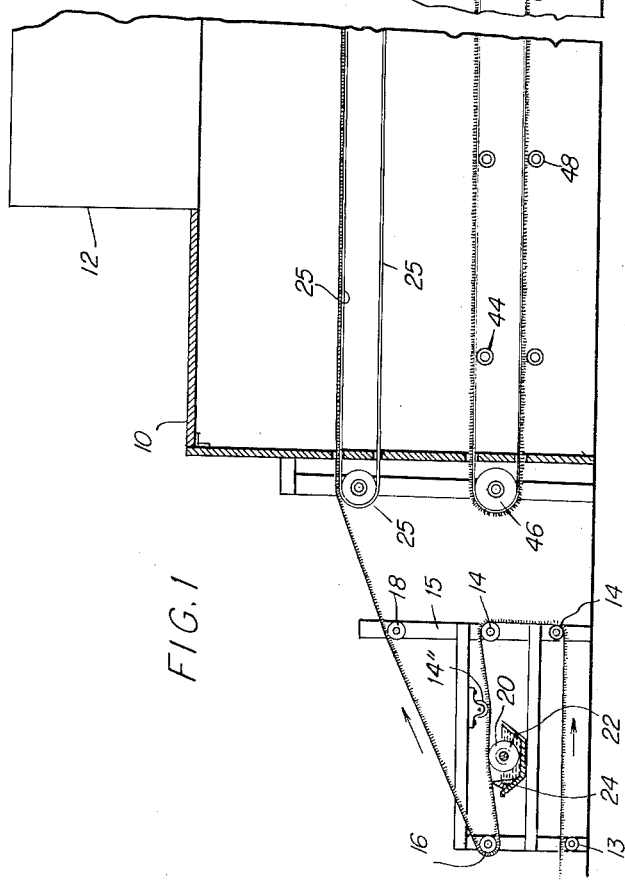
*Inventors*
William M. Sapp, Jr.
Roger J. McNamara
By their attorneys
*Hewson and Hewson*

3,007,836
METHOD AND APPARATUS FOR PRODUCING A RUG WITH A LAMINATED BACKING

Roger J. McNamara and William M. Sapp, Jr., Dalton, Ga., assignors to Cabin Crafts, Inc., Dalton, Ga., a corporation of Georgia
Filed Nov. 21, 1957, Ser. No. 697,999
11 Claims. (Cl. 156—310)

This invention relates to tufted rugs. More particularly, it relates to a tufted rug having a latex-base coating on its back to which is adhered a lamination or sheet of woven material making the rug resistant to shrinkage and stretching and imparting improved non-skid properties. The invention also relates to a machine and method for applying the lamination and making the finished product.

Tufted rugs are commonly made by yarn-carrying needles penetrating a backing sheet of heavy cloth or other woven material forming loops on the opposite side from the needles as the needles are withdrawn. The pile thus formed may consist of either cut or uncut loops, or both. In order to anchor in the backing the yarn of which the tufts or loops are made, it has been a common practice to apply a coating of material having a latex base. The coating is applied as a liquid composition and then dried and cured by hot air. Such rugs have a tendency to shrink and to stretch rather easily under varying conditions which cause an undesirable, uneven appearance. They also tend to shrink after washing. When ordinary tufted carpeting is installed wall to wall, the installer usually has to make one or more additional trips to the home to restretch the carpet. Climatic changes cause considerable trouble, particularly with nylon pile because of increase or decrease in the amount of moisture in the air. Such changes in humidity produce visible results in that the carpet will "grow," producing wrinkles; and in wall-to-wall installations, the carpet becomes loose and "stretchy." Dry weather produces the opposite result in that as the wrinkles disappear, the carpet becomes tight.

When the invention described herein is applied to such prior types of carpeting, the carpet can be stretched only slightly even with power stretchers. This slight amount of stretch is considered necessary and desirable to make a good installation. Complaints which had heretofore been made because of the wrinkling and stretching of the carpet fade away when the present invention is used. The present invention provides desirable stability which had heretofore been lacking.

It is an object of the invention to provide as a new article of commerce a tufted rug having a latex-base coating on its back to which is adhered a lamination which tends to overcome shrinkage and stretching and improves the non-skid characteristics of the rug.

Another object of the invention is to provide a machine for continuously applying a lamination having the aforesaid characteristics to lengths of tufted rugs in the course of applying and curing the latex-base coating on the back of the rug. A related object is to provide a machine to accomplish the foregoing without interfering with the drying and curing of the latex backing composition on the back of the rug.

Another object of the invention is to provide a process for continuously applying a lamination having the aforesaid characteristics to the back of a tufted rug whose back has a coating anchoring the tufting yarn, the introduction and application being accomplished without interfering with the drying and curing of the latex coating.

Another object of the invention is to accomplish the foregoing objectives without loss of production of the normal drying machine and process.

Other objects and advantages of the invention will appear as it is described in connection with the accompanying drawing.

In the drawing:

FIG. 1 is a side elevation view, partly in section, diagrammatically illustrating the invention as embodied in a rug drying machine.

FIG. 2 is a perspective view partly broken away and partly in section, of a piece of a rug embodying the invention.

Referring to the drawing, the invention is shown as applied to a common type of machine used for applying a latex-base coating or backing to a rug and for drying and curing the coating on the back or bottom surface of the rug. Such coatings are commonly applied to the back of tufted rugs to anchor the yarn tufts or stitches to the backing sheet or ground cloth. The coating composition, applied as a liquid, becomes hard but flexible as it is dried and cured.

The dryer comprises a large and long housing 10 of generally rectangular form and of such height as to permit connected lengths of rug to be passed back and forth horizontally through the housing several times. The length of the housing is determined by the amount of drying necessary and the temperature, humidity and desired speed of the rug through the housing and other factors. The width may commonly be sufficient to take the greatest width of rug which may have to be treated. The length of the housing may in some instances be as much as 60 feet. One length of rug is commonly fastened to another so that a series of connected lengths of rug is fed through the housing continuously as the process and machine continuously operate.

On the top part of the housing is a penthouse 12 in which are located conventional fan blowers and heaters (not shown) to cause circulation of hot air within the housing 10. The housing and penthouse may be constructed of insulated panels mounted on a supporting framework, the details of the construction of the housing per se forming no part of the invention.

The connected lengths of rug from the rug-making machine are fed over and around horizontal supporting and guide rollers 13, 14, 14', 14" which may be mounted upon any suitable framework 15 outside and located adjacent one end of the dryer housing 10.

As illustrated, the rug is trained over the horizontal supporting roller 13 at one end of the frame 15 and then horizontally to and around the guide roller 14 at the opposite end of the frame 15 and then vertically up and around the guide roller 14' located above the roller 14. The rug then moves horizontally in the reverse direction under a guide roller 14" and around a driven pull-roller 16 horizontally located and supported at the entrance end of the frame 15 above roller 13. This roller 16 provides sufficient drag to pull the length of the rug from the source of supply and through the frame 15. The rug, in passing over the roller 13 and around the roller 14, has its pile or upper surface facing downwardly so that as it returns through the frame 15 after passing over the guide roller 14' and under the guide roller 14", the bottom surface of the rug is facing downwardly.

In order to apply to the bottom surface of the rug the liquid latex-base composition, there is provided a horizontal licker or coating roller 20 supported in any suitable fashion by a frame 15 with its lower portion immersed in a tank or trough 22, also supported by the frame 15 in any suitable fashion. This trough contains the liquid coating. This roller is preferably larger than the guide rollers 13, 14 and 16 and the rug is held down upon the top surface of the roller 20 by locating the rollers 14" and 16 with the lowest portions of their peripheries below the uppermost portion of the periphery of the roller 20.

In order to remove any excess of the liquid composition that was applied by the licker roll 20 to the rug, a horizontal scraper bar 24 is supported by the framework 15 over the tank 22 in position to cause the excess to be scraped from the bottom surface of the rug and to drop down into the tank 22. This scraper serves also to cause penetration of the coating composition into the rug.

After being pulled over the licker roll 20 by the driven roller 16, the rug passes obliquely upward over a guide roller 18 mounted at the top of the opposite end of the supporting frame 15 and then on to a tenter frame, designated generally by numeral 25. The tenter frame is of conventional commercial construction comprising the usual pair of spaced parallel chains having pins projecting therefrom on which the rug is impaled adjacent each edge to maintain the rug stretched to the desired width during drying of the latex-coating. The tenter frame runs horizontally through the upper part of the housing 10 on tracks which support it. As will be observed, the passage of the rug around the driven roller 16 and over the guide roller 18 causes the coated bottom surface of the rug to be uppermost when it enters on the tenter frame into the housing 10 and on its first pass therethrough. During the first pass of the rug through the housing 10, hot air is caused to be directed against the wet upper surface of the rug which causes the latex coating material to dry and harden.

Heretofore, the rug has then been redirected for a second and third pass through the dryer housing 10 causing the final curing and hardening of the coating.

According to the present invention, the rug at the conclusion of the first pass through the housing is led out a port in the opposite or exit end of the housing and around a horizontal guide roller 30 supported outside of that end, in any suitable fashion. The rug then passes obliquely upward around another guide roller 31 to apparatus for applying a lamination to the back of the rug, as will now be described.

The lamination to be applied to the latex-coated back of the rug is a loosely woven paper mesh material, preferaly of about ¼″ mesh, although larger or smaller mesh may be used as well. This woven paper mesh material may be purchased upon the market and is frequently called "scrim." For convenience hereinafter, it will be so designated. The scrim is preferably of the same width as the rug so as to overlie the entire width of the rug. Upon the top of the dryer housing 10 adjacent one end, a supply roll 34 of scrim may be supported in any suitable fashion on a horizontal axle.

From the guide roll 31, the rug is trained around a large horizontally mounted supporting roll or drum 32 and then proceeds obliquely downward to and around a guide roll 40 supported below the guide roll 30 in any suitable fashion adjacent the exit end of the dryer housing 10. The roll 40 in position for the rug to re-enter through a port or opening in that end for a second pass through the dryer.

The scrim from the supply roll 34 passes over a horizontal guide roll 35 and then under a horizontal positioning roll 36 which is immersed in a tank or trough 37. The tank 37 contains a liquid adhesive material to cause the scrim lamination to adhere to the latex-coated back of the rug. The adhesive is compatible to the latex coating on the rug and composed of natural latex with fractional percentage additions of stabilizers, accelerators and coagulants.

The scrim, after being immersed and passing around the positioning roller 36, passes vertically upward and is laid upon the back surface of the rug passing around the drum 32. At this stage, the pile surface of the rug is against the surface of the drum 32 and the latex-coated back of the rug is outermost.

Due to the open mesh form of the scrim, it picks up a considerable amount of liquid adhesive in passing through the tank 37. In order to remove excess adhesive, a series of compressed air nozzles 38 extend from a header pipe 39 to which compressed air is fed by a hose or pipe connection or in any other suitable fashion from a compressed air source not shown. Preferably the nozzles are aligned in a series with the jets of air issuing therefrom overlapping as they are directed against the scrim. By controlling the air pressure at these jets, the proper amount of adhesive may be left adhering to the scrim, "windows" in the mesh will be blown clear and the excess will be blown off against a raised side of the trough or tank 37.

Although the latex coating on the back of the rug is dry to the touch as the rug issues from the first pass through the dryer, the coating is not yet completely cured at the time that the adhesive-wetted scrim is applied.

The adhesive composition is sufficiently tacky to stick to the latex coating on the rug as the scrim comes in contact therewith. The scrim, thus, immediately becomes adhered to the back of the rug. The latex backing is particularly receptive at this stage to the adhesive-wetted scrim so that the wet-scrim tends to adhere tightly and become bonded to the latex coating on the rug. Moreover, at this stage the rug has only recently issued from the dryer and, hence, is at an elevated temperature well above room temperature, usually approximately about 190° F. since the temperature within the dryer is customarily kept at about 280–320° F.

In order to cause scrim to adhere better to the rug, several spaced small pressure rolls 42 (three being shown as a satisfactory number used in practice) whose axes are parallel to the drum 32 press the scrim on the rug back. These pressure rolls are preferably located slightly less than halfway around the drum from the point of first adherence of the scrim to the rug. These pressure rolls tend to iron out blisters and to press the mesh onto the rug backing firmly at all points across the whole width of the rug.

Preferably a Teflon[1] coating is placed on these pressure rolls as it does not tend to pick up the adhesive, but rather to maintain the pressure rolls clean.

It is desirable that the drum 32 be of relatively large diameter such as approximately three feet in diameter to reduce a tendency of the scrim to crawl on the rug back as is apt to occur when a smaller roll is used. The larger the drum, the less is the curvature of its circumference and the less is the tendency of the scrim to crawl upon or over the surface of the rug.

After leaving the drum 32 and pressure rollers 42, the rug with the scrim lamination adhering thereto passes around the guide roll 40 and enters in a horizontal direction the exit end of the dryer housing 10. The rug is supported inside the housing by a series of parallel horizontal supporting rolls 44 and passes from one end of the dryer to the other, being subjected to the movement of the hot air to cause drying of the adhesive coated scrim and further curing of the latex backing upon the rug. The rug then passes out the opposite entrance end of the dryer, around a horizontal guide roller 46 supported in a suitable fashion outside and adjacent that end of the dryer. The rug is then redirected back through another lower port and over another series of supporting rollers 48 in the housing as the rug is led on its third pass through the dryer in a horizontal direction.

Upon completion of the third pass, the rug leaves the dryer and is then fed to a take-up roll 54 in any suitable or conventional fashion, being pulled out of the housing by a pair of rubber covered rolls 50 which may be power-driven in any suitable fashion. Usually, the pile is subjected to the action of a beater 52 prior to passing around the pull rolls. The shipping or take-up roll 54 may be located at any suitable distance to permit the rug to cool to room temperature prior to being rolled upon the shipping or take-up roll.

---

[1] Trademark.

In FIGURE 2, a section of rug embodying the invention is shown. The backing sheet or foundation sheet 60 may be of heavy cloth, canvas, duck or any of the woven materials usually used by tufted rug manufacturers or suitable for that purpose. The pile is formed by successive penetrations of one or a bank of needles carrying yarn through the cloth forming rows of a plurality of tufts or stitches 62. The yarn forming the stitches or loops 62 is anchored by the latex-base coating 64 on top of which the lamination 66 of woven paper mesh is adhered by the drying of the adhesive in which the mesh was immersed before being applied to the coated back of the foundation sheet.

The composition used to form the coating on the back of the rug varies among different manufacturers. It may also be advisable to vary it for different conditions such as when the rug is to be dyed after completion of the process. The choice of the composition may be made to suit conditions without departing from the scope of the invention.

Without limiting the invention thereto, one example of a suitable composition is the following:

| | Parts dry weight |
|---|---|
| Natural latex (62%) | 100.00 |
| Stabilizer—potassium hydroxide (KOH) | .20 |
| Stabilizer—potassium caseinate | 2.00 |
| Sulphur | .80 |
| Activator—zinc oxide | 2.00 |
| Antioxidant—2,2'-methylene - bis(4-ethyl-6-tertiarybutyl phenol), (such as American Cyanamid Antioxidant No. 425) | .75 |
| Filler—calcium carbonate | 250.00 |
| Pigment—titanium dioxide | 10.00 |
| Synthetic latex—butadiene-styrene copolymer, 10% butadiene, 90% styrene | 25.00 |
| Accelerator—2-mercaptobenzothiazole (MBT) | 1.00 |
| Deodorant—sassafras oil | .50 |
| Thickener—karaya gum | .36 |
| Thickener—sodium polyacrylate (such as Alcogum) | 1.50 |
| Accelerator—zinc dibutyldithiocarbamate (such as Butyl Zimate) | 2.00 |
| Water | wet wt.. 265.00 |

Small amounts of other conventional additives may also be added as desired. Thus, the formulation may include a stabilizer such as a sodium alkyl aryl sulfonate, e.g. sodium lauryl benzene sulfonate or Du Pont's Aquarex ME, in amounts on the order of 0.15% by weight. A dispersing agent, e.g. a sodium salt of a carboxylated polyelectrolyte such as Tamol 371 may also be added in small amounts, on the order of 0.2% by weight. Antifoam agents such as silicone pastes or emulsions may also be employed in concentrations on the order of say 0.003% by weight.

The composition of the adhesive may vary also to suit different conditions. It is desirable that the adhesive be compatible with the coating so as not to have any deleterious effect on the coating either during the process or during the useful life of the rug, nor to adversely affect the time or degree of curing of the composition. It is desirable also that the compositions of the adhesive and of the coating have a mutual affinity for one another so that their cooperative effects on one another result in a firm bond of the lamination of the rug.

Without limiting the invention thereto, one example of a suitable composition for the adhesive is the following:

| | Dry parts |
|---|---|
| Natural latex, centrifuged | 100.00 |
| Stabilizer—potassium hydroxide (KOH) (added as a 20% aqueous solution) | 1.00 |
| Activator—zinc oxide (added as a 50% aqueous dispersion) | 1.00 |
| Antioxidant—2,2'-methylene-bis (4-ethyl-6-tertiarybutyl phenol) (American Cyanamid Antioxidant No. 425 added as a 40% aqueous dispersion) | 2.00 |
| Curing agent—dipentamethylene-thiuram-tetrasulfide (Du Pont's Tetrone A added as a 40% aqueous dispersion) | 2.00 |
| Accelerator—zinc dibutyl dithiocarbamate (Butyl Zimate) | 1.00 |
| Sulphur | 1.00 |

This formula should not be stored more than four to five days after mixing and prior to use.

The adhesive may also include small amounts (i.e. on the order of 0.4–0.5% by weight) of a stabilizer such as a sodium alkyl aryl sulfonate, e.g. sodium lauryl benzene sulfonate or Du Pont's Aquarex ME.

This adhesive composition has been found very satisfactory in use in connection with the coating composition of the foregoing example, due at least in part to the use of latex as a basic ingredient in each. It will be understood, however, that the invention is not limited to compositions in which latex is the basic ingredient of each or in which the bonding materials are the same.

Although woven paper has been found to be a satisfactory lamination to be adhered to the back of the rug, it will be understood that the scope of the invention includes laminations made of equivalent materials. As possible equivalents, jute, cord, strong yarn and the like having tensile strength and absorbency equal to woven paper are suggested without limitation, however, to such materials as equivalents. As previously indicated, the size of the openings or tightness of the weave of the mesh lamination may be lessened or increased within the scope of the invention.

From the foregoing, it will be observed that the invention provides a new rug structure as well as a new method and machine for applying the additional lamination which characterizes said new rug structure.

Many modifications within the scope of the invention will occur to those skilled in the art. Therefore, the invention is not limited to the precise form and dimensions and materials set forth in describing the preferred embodiment herein.

What is claimed is:

1. A carpet treating machine comprising means to apply a coating to the back of continuous lengths of carpeting, drying means enclosed in a housing, means to pass the coated carpeting through the dryer housing and to dry said coating, means to apply a lamination of woven open mesh material to the coated side of said rug comprising means to impregnate said lamination with an adhesive, a rotatable drum adjacent said impregnating means around which the carpeting passes, means to continuously lay the impregnated lamination upon the coated side of the carpeting, said drum having a large diameter to overcome tendency of the lamination to crawl over the carpeting, means to pass the laminated carpeting into and through the dryer housing to dry and cure said adhesive.

2. A carpet treating machine comprising means to apply a coating to the back of continuous lengths of carpeting, drying means enclosed in a housing, means to pass the coated carpeting through the dryer housing and to dry said coating to the point where it is no longer tacky, means to maintain the carpeting at a predetermined width during said pass, means to apply a lamination to the coated side of said rug comprising means to impregnate said lamination with an adhesive, means to continuously lay the impregnated lamination upon the coated side of the carpeting prior to final drying and curing of said coating, and means to pass the laminated carpeting into and through the dryer housing to finally dry and cure said coating and to dry and cure said adhesive.

3. A carpet treating machine as claimed in claim 2 having a rotatable drum adjacent said impregnating means around which the carpeting passes, said lamination being laid on the carpeting as it passes around said drum, said drum having a large diameter to overcome tendency of the lamination to crawl over the carpeting.

4. A carpet treating machine as claimed in claim 3 having a series of spaced pressure rolls adjacent said drum pressing said lamination against the carpet at spaced positions less than one-half the distance around the drum from the point of first contact of said lamination with the carpet.

5. A carpet treating machine as claimed in claim 4 in which the radius of the drum surface curvature is 1½ feet approximately, at least, to prevent creeping of the lamination on the carpet.

6. A carpet treating machine as claimed in claim 1 in which the radius of the drum surface curvature is 1½ feet approximately, at least, to prevent creeping of the lamination on the carpet.

7. A carpet treating machine as claimed in claim 1 having a series of spaced pressure rolls adjacent said drum pressing said lamination against the carpet at spaced positions less than one-half the distance around the drum from the point of first contact of said lamination with the carpet.

8. A carpet treating machine as claimed in claim 7 having pneumatic means adjacent said impregnating means to remove excess adhesive from said lamination and open the mesh apertures prior to applying the lamination to the carpet.

9. A carpet treating machine as claimed in claim 6 having pneumatic means adjacent said impregnating means to remove excess adhesive from said lamination and open the mesh apertures prior to applying the lamination to the carpet.

10. A carpet treating machine as claimed in claim 9 in which the excess-removing means includes means to direct a blast of air against said lamination to blow off the excess adhesive.

11. The process of continuously applying a lamination to the back of a continuous length of carpeting comprising continuously moving the carpeting lengthwise while applying a liquid latex-base composition coating to the back of the carpeting, drying said coating to a point whereat it is no longer tacky while the carpeting continues moving, immersing a continuously moving open mesh layer into a liquid adhesive, removing excess adhesive from the mesh and simultaneously opening the "windows" of adhesive therein, applying the wet mesh to said coated dried back of the carpeting while both continue moving, applying pressure to said lamination at spaced points along an arcuate path while the carpeting is passing over said path to press said layer against said carpeting, and drying the adhesive while completing the drying and curing of said coating while the carpeting continues moving.

References Cited in the file of this patent

UNITED STATES PATENTS

| | | |
|---|---|---|
| 533,690 | Whittall | Feb. 5, 1895 |
| 1,947,152 | Clark | Feb. 13, 1934 |
| 1,969,855 | Richter et al. | Aug. 14, 1934 |
| 2,226,631 | Miller | Dec. 31, 1940 |
| 2,641,296 | Marco | June 9, 1953 |
| 2,675,337 | Walker et al. | Apr. 13, 1954 |

FOREIGN PATENTS

| | | |
|---|---|---|
| 464,421 | Great Britain | Apr. 19, 1937 |

UNITED STATES PATENT OFFICE
CERTIFICATE OF CORRECTION

Patent No. 3,007,836                          November 7, 1961

Roger J. McNamara et al.

It is hereby certified that error appears in the above numbered patent requiring correction and that the said Letters Patent should read as corrected below.

Column 3, line 55, after "The roll 40" insert -- The roll 40 is --; column 7, line 33, for the claim reference numeral "6" read -- 1 --.

Signed and sealed this 10th day of April 1962.

(SEAL)
Attest:

ERNEST W. SWIDER                          DAVID L. LADD
Attesting Officer                             Commissioner of Patents